(12) United States Patent
Kasravi et al.

(10) Patent No.: US 9,557,895 B2
(45) Date of Patent: Jan. 31, 2017

(54) ELECTRONIC BOOK WITH CHANGEABLE PATHS

(75) Inventors: Kas Kasravi, W. Bloomfield, MI (US); William Sheridan, Gilbert, AZ (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 352 days.

(21) Appl. No.: 13/883,364

(22) PCT Filed: Jan. 27, 2011

(86) PCT No.: PCT/US2011/022683
§ 371 (c)(1),
(2), (4) Date: May 3, 2013

(87) PCT Pub. No.: WO2012/102718
PCT Pub. Date: Aug. 2, 2012

(65) Prior Publication Data
US 2013/0268880 A1    Oct. 10, 2013

(51) Int. Cl.
*G06F 3/048* (2013.01)
*G06F 3/0484* (2013.01)
*G06F 3/0483* (2013.01)
*G06F 17/30* (2006.01)

(52) U.S. Cl.
CPC ........... *G06F 3/0484* (2013.01); *G06F 3/0483* (2013.01); *G06F 17/30873* (2013.01); *G09G 2380/14* (2013.01)

(58) Field of Classification Search
CPC  G06F 3/0483; G06F 17/241; G06F 17/30722; G06F 17/3087; G06F 2203/04807; G06F 3/0482; G06F 3/04883; G06F 11/2007; G06F 11/201; G06F 11/2053; G06F 3/061; G06F 3/0635; G06F 3/0658; G06F 3/0683; G06F 17/30395; G06F 17/30607
See application file for complete search history.

(56) References Cited

U.S. PATENT DOCUMENTS

| | | |
|---|---|---|
| 5,893,109 A | 4/1999 | Derose et al. |
| 7,069,518 B2 | 6/2006 | Card et al. |
| 7,506,246 B2 | 3/2009 | Hollander et al. |

(Continued)

FOREIGN PATENT DOCUMENTS

| | | |
|---|---|---|
| CN | 101354840 A | 1/2009 |
| EP | 2187639 A1 | 5/2010 |

(Continued)

OTHER PUBLICATIONS

PCT; "Notification of Transmittal of the International Search Report and the Written Opinion of the International Searching Authority, or the Declaration": PCTI1JS20111022683; dated Sep. 30, 2011; 9 pages.

(Continued)

*Primary Examiner* — William Bashore
*Assistant Examiner* — Rayeez Chowdhury
(74) *Attorney, Agent, or Firm* — Mannava & Kang, P.C.

(57) ABSTRACT

An e-book (112) has navigation controls (124) for accessing the sections (110) of a first path (130) of sections of the e-book. In response to receipt (101) of a path-change command (134), the active path (129) is changed to a second path (132). Concomitantly, the navigation controls are changed so that they provide for navigation along the second path instead of along the first path.

15 Claims, 6 Drawing Sheets

(56) References Cited

U.S. PATENT DOCUMENTS

| | | | |
|---|---|---|---|
| 7,770,123 B1* | 8/2010 | Meyer | G06F 9/4446 707/999.107 |
| 2002/0113823 A1 | 8/2002 | Card et al. | |
| 2002/0120635 A1 | 8/2002 | Joao | |
| 2003/0006969 A1* | 1/2003 | Barras | G09B 5/02 345/169 |
| 2004/0030719 A1* | 2/2004 | Wei | G06F 17/30905 |
| 2004/0093279 A1 | 5/2004 | Yamanoue et al. | |
| 2005/0198070 A1* | 9/2005 | Lowry | G06F 17/30619 |
| 2006/0041839 A1* | 2/2006 | Kassan | G06F 17/211 715/274 |
| 2006/0155914 A1 | 7/2006 | Jobs et al. | |
| 2008/0222552 A1* | 9/2008 | Batarseh | G09B 5/02 715/776 |
| 2008/0256444 A1* | 10/2008 | Wang | G06F 17/30864 715/700 |
| 2009/0257180 A1 | 10/2009 | Davis et al. | |
| 2010/0094880 A1 | 4/2010 | Rogers et al. | |
| 2010/0100551 A1 | 4/2010 | Knauft et al. | |
| 2010/0198375 A1* | 8/2010 | Rottler | G06F 3/0482 700/94 |
| 2011/0191692 A1* | 8/2011 | Walsh | G06F 3/00 715/752 |
| 2011/0202469 A1* | 8/2011 | Venkateswaran | G06F 3/0486 705/301 |
| 2014/0180860 A1 | 6/2014 | Kasravi et al. | |

FOREIGN PATENT DOCUMENTS

| | | |
|---|---|---|
| JP | 1992-288641 | 10/1992 |
| JP | 1994-502734 | 3/1994 |
| JP | 1996-044759 | 2/1996 |
| JP | 09073487 | 3/1997 |
| JP | 2002-512716 | 4/2002 |
| JP | 2002251577 | 9/2002 |
| JP | 2003050841 | 2/2003 |
| JP | 2010-267214 | 11/2010 |
| KR | 10-2009008864 A | 8/2009 |
| KR | 10-20090111760 A | 10/2009 |
| KR | 10-2009-0131228 | 12/2009 |
| WO | WO-2004111879 A1 | 12/2004 |
| WO | WO-2006054113 A1 | 5/2006 |
| WO | WO-2010082207 | 7/2010 |

OTHER PUBLICATIONS

Apple Computer, Inc., "iPod nano Features Guide," Mar. 28, 2006, 60 pages.
Wikipedia, "Amazon Kindle," Jan. 1, 2011, 15 pages.
Wikipedia, "Google Books," Jan. 2, 2011, 13 pages.
William D. Mounce, "Track One or Track Two?," The Basics of Biblical Greek, 2nd ed., 2003, pp. i, iv-ix, xiii-xvii, 73-74.
Hewlett-Packard Development Company L.P., "Breathe new life into forgotten archives with HP BookPrep", Copyright 2010, 8 pages.
PCT; "Notification of Transmittal of the International Search Report and the Written Opinion of the International Searching Authority, or the Declaration"; for PCT/US2011/051308: mailed Apr. 27, 2012: 9 pages.
Supplementary European Search Report issued in EP Appl. No. 11857343.5; dated Sep. 19, 2016; 8 pages.

* cited by examiner

450 ⌐ 454

| ☑ "BIOMETRICS PATH" 452 |
|---|
| BIOMETRICS: 300<br>INFRASTRUCTURE MANAGEMENT * SECUIRTY * PRIVACY * BIOMETRICS |
| → SMART CARDS: 502<br>SECURITY * SMART CARDS * WORKFORCE MANAGEMENT * RE-USE * TEXT MINING |
| DATA EXPLOSION: 504<br>PARALLEL DATABASES * DATA EXPLOSION * SEARRCH * CONTENT MANAGEMENT * TEXT MINING |
| EDIT CURRENT PATH 506 |
| CREATE NEW PATH 508 |

FIG. 5

| E-BOOK 200 |
|---|
| READ CONTENTS 430 |
|    SECTIONS 201-215 |
|    APPENDICES 432 |
| MAP 220 |
| NAVIGATION CONTROLS 432 |
|    TABLE OF CONTENTS (TOC) 440 |
|       ☑ PATH: "SMART CARDS" 502 |
|       "CHAPTER 1: SECURITY" 662 |
|       "CHAPTER 2: SMART CARDS" 664 |
|       "CHAPTER 3: WM" 666 |
|       "CHAPTER 4: RE-USE 668 |
|       "CHAPTER 5: TEXT MINING" 670 |
|       APPENDIX IDs 444 |
| PROPERTY DATA 434 |
| USAGE DATA 436 |
| RIGHTS DATA 438 |

ELECTRONIC BOOK WITH CHANGEABLE PATHS

BACKGROUND

Electronic books (e-books) are increasingly popular for several reasons including low production, and lower manufacturing (and potentially retail) costs, as well as the light weight, and low bulk associated with some e-readers (which may have capacity for thousands of books apiece). In addition, the computer or computer-based device on which e-books are read can be used to support rich media types (e.g., video and interactivity).

BRIEF DESCRIPTION OF THE DRAWINGS

FIG. 5 is a representation of a drop-down menu for selecting paths for the e-book of FIG. 2.

FIG. 6 is a schematic diagram of the e-book of FIG. 2 after a path change command has been executed.

DETAILED DESCRIPTION

Figure 1:
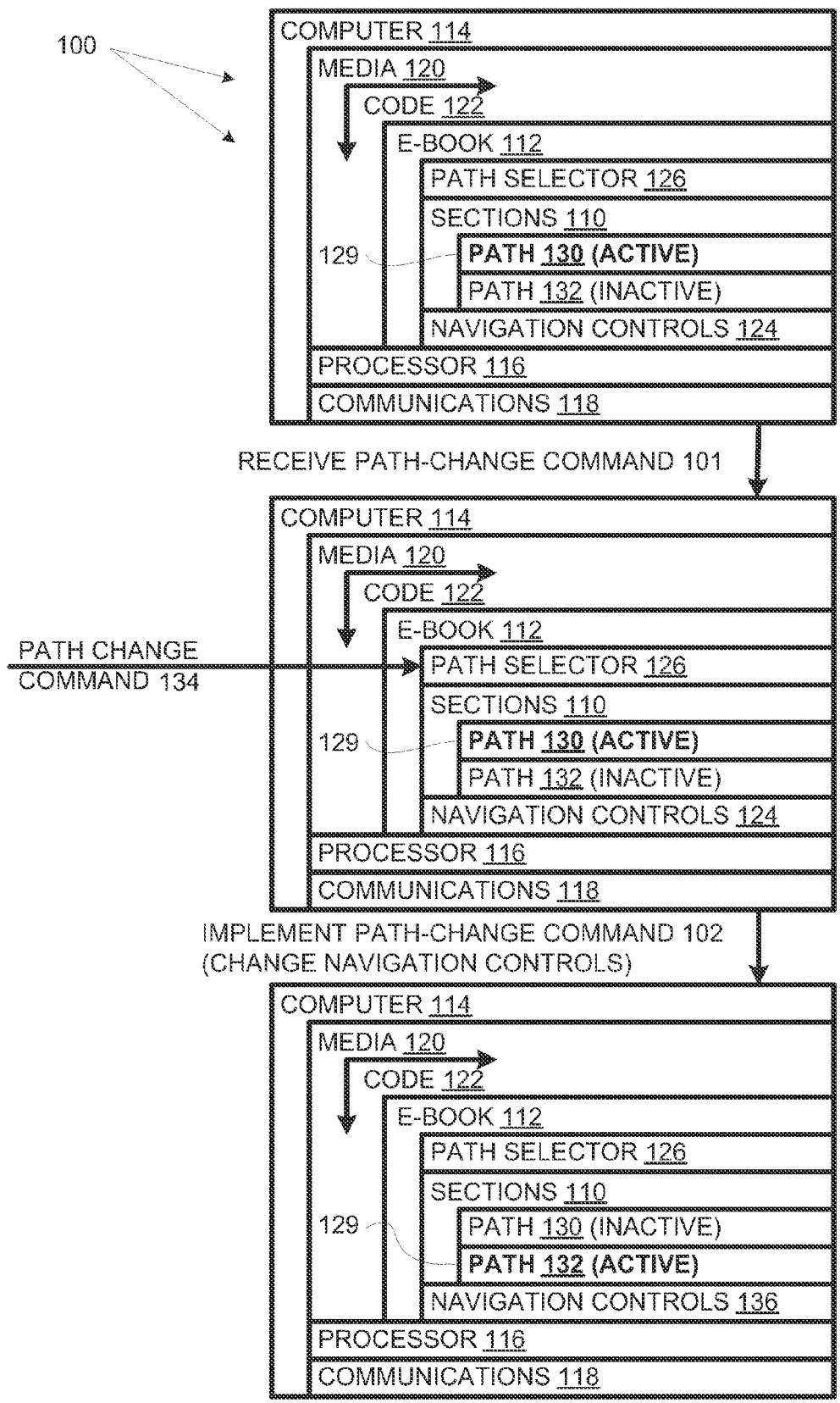
FIG. 1 is a combination flow chart and schematic diagram of a process and system in accordance with examples.

A process 100 of re-arranging sections 110 of a re-arrangeable electronic book (e-book) 112 is shown in FIG. 1. Process 100 can be executed on a computer 114, which is configured to serve as an e-reader. Computer 114 includes a processor 116, communications (including input-output) devices 118, and computer-readable storage media 120. Media 120 is encoded with code 122 which defines e-book 112. E-book 112 includes content sections 110, navigation controls 124, and a path selector 126. Sections 110 can be arranged according to paths 130 and 132, each of which specifies a respective series of some or all of sections 110.

Path selector 126 is an active element configured to, when executed by processor 116, change the active path 129, e.g., from path 130, before process segment 101, to path 132, after process segment 102. Thus, at process segment 101, e-book 112 receives a path change command 134. At process segment 102, path selector 126 executes path change command 134 changing the active path to path 132. Changing active path 129 changes the navigation controls as well, so navigation controls 136 replace navigation controls 124, which may change which sections can be accessed.

A path can be chosen that presents sections in an order most useful to a given reader. Also, a given path may or may not include all sections of a book. Thus, a path can be selected that omits sections that are not of interest to a given reader. Also, the order in which paths are arranged can be selected to match the interest of the reader or the objectives of a course instructor.

Figure 2:
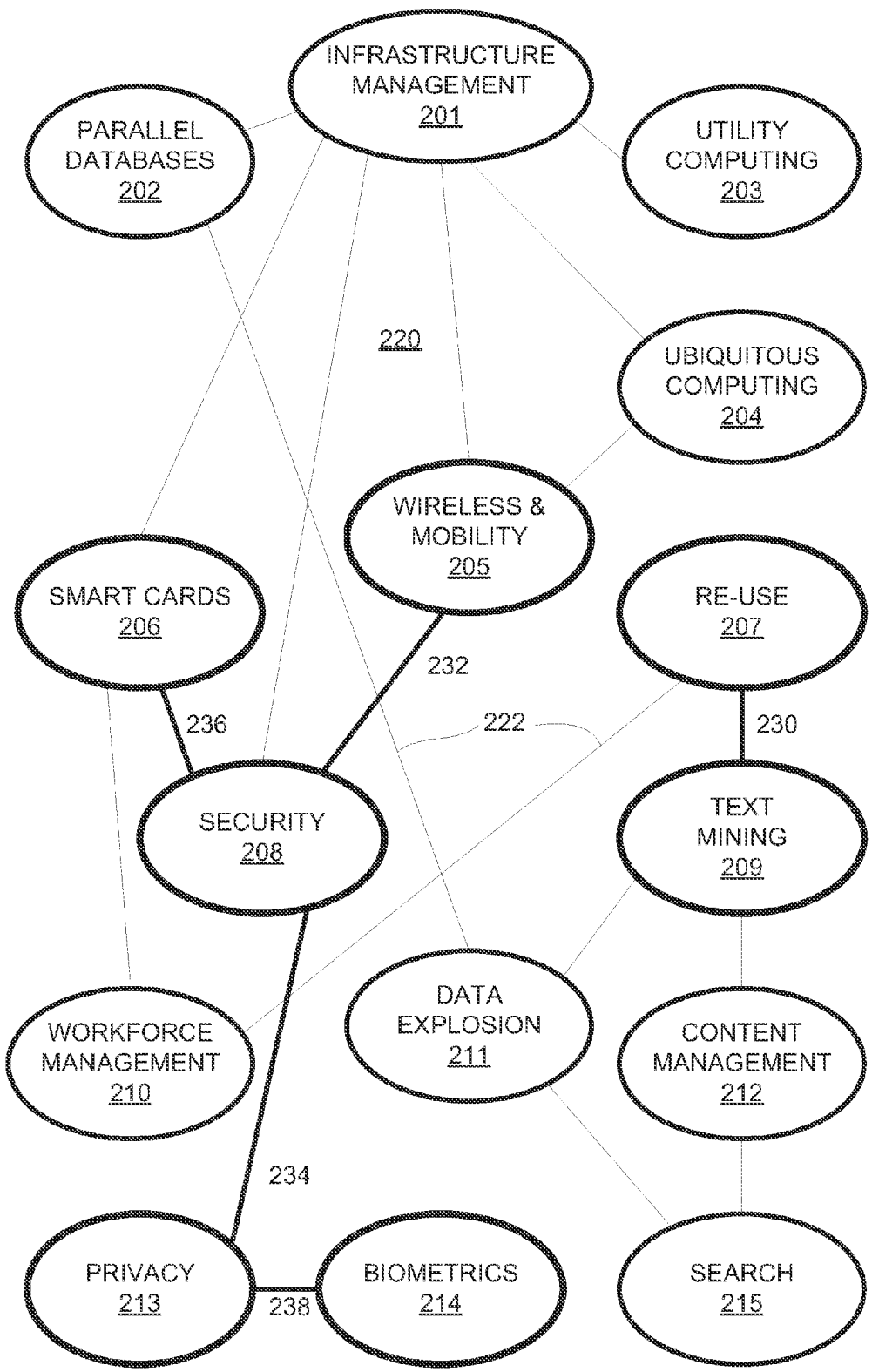
FIG. 2 is map of an e-book in accordance with an example.

Consider an e-book 200, a map 220 of which is shown in FIG. 2, entitled "INFORMATION TECHNOLOGY MANAGEMENT" having the following default linear arrangement of sections: "Infrastructure Management" 201, "Parallel Databases" 202, "Utility Computing" 203, "Ubiquitous Computing" 204, "Wireless & Mobility" 205, "Smart Cards" 206, "Re-Use" 207, "Security" 208, "Text Mining" 209, "Workforce Management" 210, "Data Explosion" 211, "Content Management" 212, "Privacy" 213, "Biometrics" 214, and "Search" 215. A semantic analysis establishes relations between pairs of sections; these relationships are shown as links 222 in FIG. 2.

Figure 3:
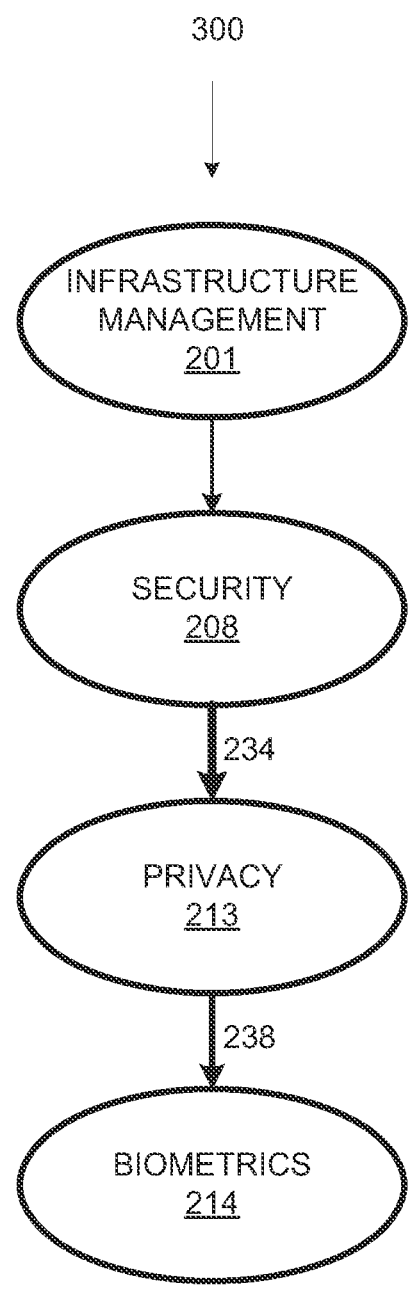
FIG. 3 is a path derived from the map of FIG. 2.

Some potential readers might not be interested in all the foregoing sections. For example, a reader focused on the use of biometrics in the context of infrastructure management might find path 300 of FIG. 3 to be most useful. Selecting path 300 might yield a scenario such as that represented in FIG. 4, which depicts a human reader 400 having an e-reader 402.

E-reader 402 is a slate-type computer having a processor 404, communications (including input-output) devices 406 such as a touch screen, and computer-readable storage media 408. Storage media 408 is encoded with code 410. Code 410 represents data, including both computer-executable instructions and other computer-readable data. Code 410 includes e-books 200, 412, and 414, e-reader software 416, an e-book assembler 418, and an e-book purchaser 420. In other examples, other e-reader form factors, including laptops and desktops, are used; other examples provide for dedicated e-readers, personal digital assistants, smart phones, game consoles, televisions and general-purpose computers with e-reader software, etc. E-reader 402 can be used for presenting content from different source media. For example, a first chapter can be located on the e-reader itself, a second chapter can be accessed from removable media engaged with e-reader 402, while a third chapter can be accessed from remote network attached storage (NAS) over a local-area network, and a fourth chapter can be accessed over the Internet, e.g., from a web site.

Figure 4:
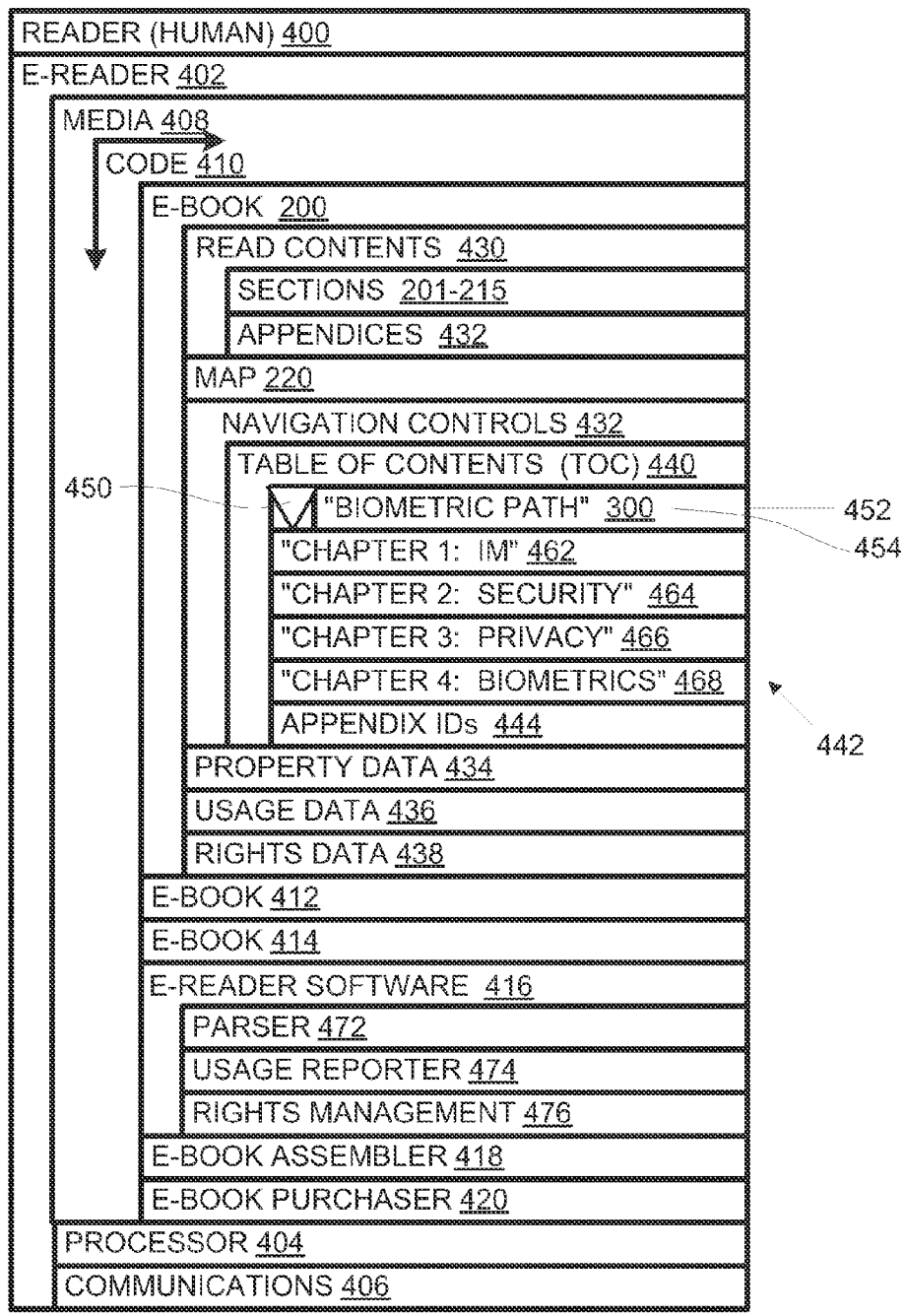
FIG. 4 is a schematic diagram of a human reader and an electronic reader (e-reader) on which the e-book represented in FIG. 2 is stored.

As shown in FIG. 4, e-book 200 includes contents 430, navigation controls 432, property data 434, usage data 436, and rights data 438. Contents 430 include sections 201-215 and appendices 444 (e.g., an index, a glossary, a bibliography, etc.). Navigation controls 432 include a dynamic table of contents (TOC) 440 that includes chapter identities 442 and locations (e.g., page numbers) and the identities and locations of appendices 444.

TOC 440 includes a drop-down menu 450 with a panel 452 indicating a currently active path 454. In FIG. 4, currently active path 454 is Biometric path 300. Accordingly, TOC 440 specifies in a list the chapter identities for the sections in path 300: "Chapter 1: Infrastructure Management (IM)" 462, "Chapter 2: Security" 464, "Chapter 3: Privacy" 466, and "Chapter 4: Biometrics" 468. TOC 440 qualifies as a navigation control 432 as the chapter and appendix identities are hyperlinks that, when activated, navigate to the identified chapter or appendix. In alternative examples, TOCs specify chapters in forms other than a list, e.g., interactive graphical representations and network diagrams.

TOC 440 is "dynamic" in that the chapters and appendices represented change when drop down menu 450 is activated and used to change the active path, as indicated in FIG. 5. In FIG. 5, three pre-established paths 300, 502 and 504 are shown, along with entries for editing 506 the current path and creating 508 a new path. As indicated by the arrow next to "SMART CARDS", path 502 is being selected. As a result, e-book 200 assumes the form indicated in FIG. 6.

Thus, e-book 200 is shown in FIG. 6 in a form in which a different "Smart Cards" path 502 has been selected. In this case, the chapters are: "Chapter 1: Security" 662, "Chapter 2: Smart Cards" 664, "Chapter 3: Workforce Management (WM)" 666, "Chapter 4: Re-Use" 668, and "Chapter 5: Text Mining" 670. A comparison of TOC 440 as presented in FIGS. 4 and 6 demonstrates the dynamic nature of TOC 440.

Changing the active path generally changes the chapters that are listed for otherwise presented) and thus the sections that can be accessed by selecting a chapter identity. In addition, the selected path can affect other navigation controls. For example, when path 502 is active as shown in FIG. 5, issuing a "next page" command from the last page of Chapter 1: Security" 662 brings up a first page of "Chapter 2: Smart Cards" 464. However, when path 300 is active (as shown in FIG. 4, a "next page" command from the last page of Chapter 2: Security" 464 brings up a first page of "Chapter 3: Privacy" 466. In addition, appendices 432 may change dynamically according to the selected path. For example, the index, glossary, and bibliography may be updated to reflect the contents of the path sections, as opposed to reflecting all sections 201-215 of e-book 200. Also, page locations, e.g., of appendices, listed in TOC 440 may change according to the selected path.

In addition to allowing selection among pre-set paths, menu 450 can provide a "create new path" entry 508 that, when selected, permits a user to define a new path. To this end, selection of a "create new-path" entry can call up map 220 as a graphical aid in selecting paths. For example, the existing links in map 220 can be used as a guide to selecting and arranging sections. However, in the illustrated examples, a user is not restricted to paths that follow existing links. In some examples, a user can create paths including sections from other e-books, e.g., sections from e-books 412 and 414 may be included in a path for e-book 200. The capability of assembling paths using sections from different books is provided by e-book assembler 418.

E-reader software 416 (FIG. 4) is a program, e.g., an executable, that interprets or translates scripts, e.g., such as those associated with real or virtual navigation controls e.g., hyperlinks, into executable code. Thus, execution of a navigation control involves execution of a translation of an associated script or hyperlink into instructions that can be directly executed by processor 404. E-reader software? 416 includes a parser 472 for interpreting e-book code to determine what e-book contents (e.g., from sections of the active path) are to be accessible.

A usage reporter 474 manages usage data 436 of e-book 200 and for e-books 412 and 414. Reporter 474 keeps track of usage of sections and paths. The usage data is stored as usage data 436, for example. Usage data 436 can be reported along with usage data from users to indicate the most popular sections, paths and other ways of clustering sections. The usage results can be fed back to e-reader 416, which can update map 220 by adjusting the weighting assigned to sections and links.

For example, in map 220, FIG. 2, sections 205, 206, 208, 213, and 214 have relatively heavy outlines indicating heavier usage for these sections than for the remaining sections. Also in FIG. 2, a strong link 230 is seen between Re-use section 207 and Text Mining section 209, another strong link 232 exists between Wireless & Mobility section 205 and Security section 208, and yet another strong link 234 is present between Security section 208 and Privacy section 213. A weaker link 236 exists between Security section 208 and Smart Cards section 206, and another weaker link 238 exists between Privacy section 213 and Biometrics section 214. Other links are substantially weaker.

The different link thickness provides for ready recognition of the most popular sections, links, and reading paths. The link thicknesses can indicate absolute popularity (so that popularity can be compared between maps) or at least relative popularity (so that links in the same wrap can be compared). Either way, the variations in link thickness can indicate the relative popularity of sections and links in an e-book. These weightings of sections and links can be used to help guide users when creating new paths.

While shown separately, usage data 436 may be considered part of and reported for analysis purposes along with property data 434 e.g., book property data (ISBN, Author, Publisher, Year, Genre, Pages), section property data (Keywords, Author, Characters, Place, Theme), path (Title, Frequency of Usage, Weight of Link, Data of creation, Creator (User), Price), user property data (Role, Gender, Age, Location, Interests, Other Paths), and domain property data (Description of domain, e.g., topic, Domain synonyms, Date of creation, Creator, e.g., user, and Other Paths).

Rights manager 476 of e-reader 416 manages digital rights for e-books 200, 412, 414, etc. For example, e-book 200 may have been acquired with some restrictions on making hard and electronic copies and on what sections may be accessed. For example, electronic copies may be prohibited or restricted to certain other commonly owned devices. Also, printed copies may be prohibited or restricted to a certain number. Furthermore, access to some of sections 201-215 may be precluded.

Figure 7:
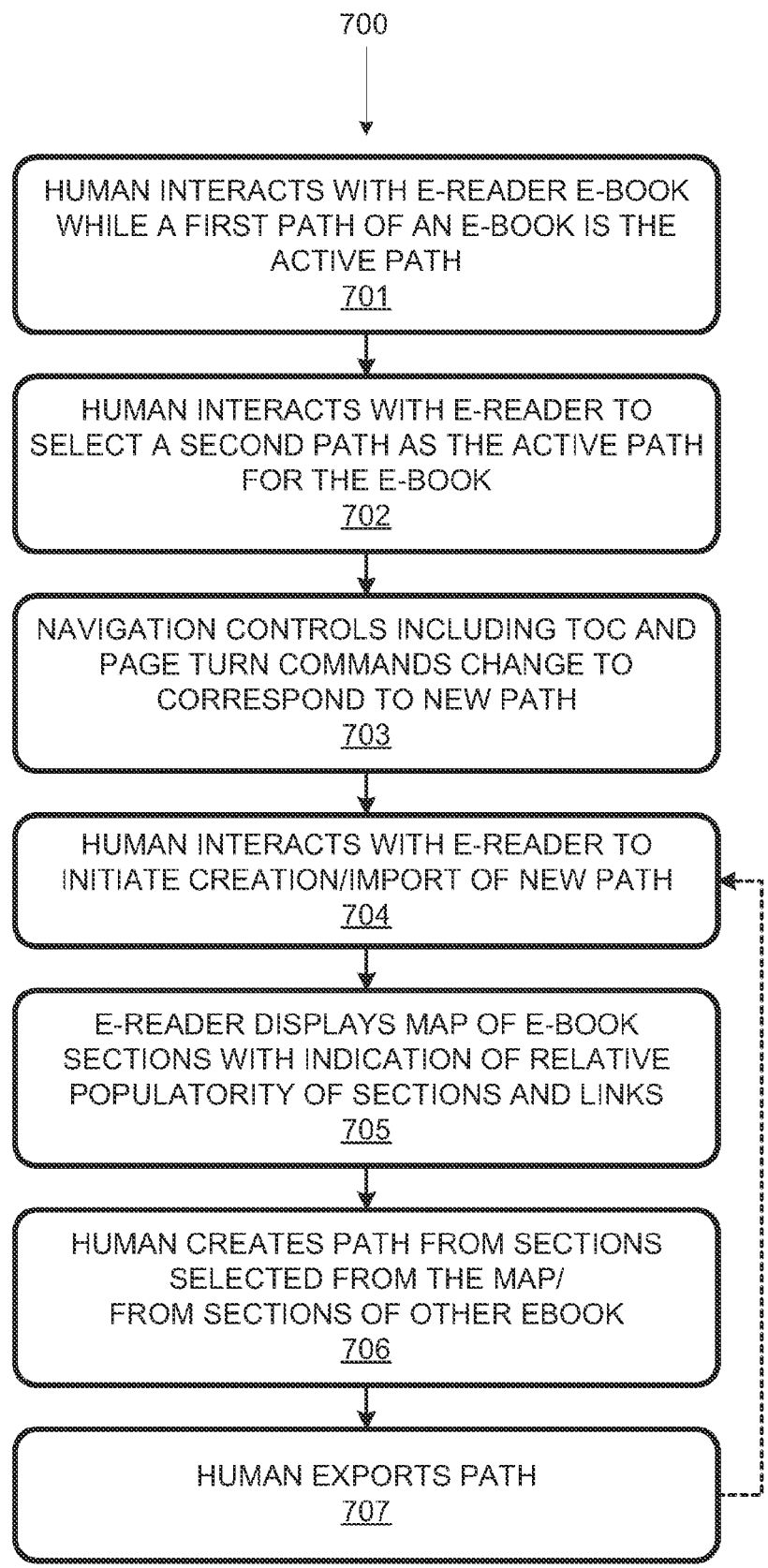
FIG. 7 is a flow chart of a path selection and creation process applicable to the e-book of FIG. 4.

An exemplary process 700 that can be implemented using e-reader 402 is flow-charted in FIG. 7. At process segment 701, human reader 400 interacts with e-reader 402 while Biometric path 300 is the active path (as indicated in FIG. 4). At process segment 702, reader 400 interacts with e-reader 402 to select Smart Card path 502 as the active path. Accordingly, e-reader 402 receives a path-change command.

At process segment 703, in response to the selection at process segment 703, navigation controls are changed to correspond to Smart Card path 502 instead of Biometric path 300. This change includes a changed table of contents 440 as shown in FIG. 6 as opposed to its form in FIG. 4. Also, page turn controls are changed to correspond to the new path. For example, Biometric path 300 and Smart Card path 502 both include Security section 208 (464 in FIG. 4 and 662 in FIG. 6). However, when Biometric path 300 is active, a next page command while the last page of Security section 208 (TOC entry 464 in FIG. 4) is displayed leads to the first page of Privacy section 213 (TOC entry 466 in FIG. 4), while, when Smart Card path 502 is active, a next page command while the last page of Security section 208 (TOC entry 662 in FIG. 6) is displayed leads to the first page of "Smart Card section 206 (TOC entry 664 in FIG. 6).

At process segment 704, which may or may not occur after a path change, human reader 400 interacts with e-reader 402 to initiate creation of a new path. Alternatively, a path, e.g., a path created by another user, can be imported at process segment 704. At process segment 705, e-reader 402 displays map 220 of sections of e-book 200, indicating relative popularities of sections 201-215 and links 222. At process segment 706, reader 200 creates a path including some or all sections 201-215. This new path can follow links 222 or may involve links not explicitly represented in FIG. 2. Alternatively or in addition, the new path can include sections from other e-books, e.g., e-books 412 and 414 of FIG. 4. At process segment 707 a user-created path can be exported, e.g., stored media separately from e-book 402, so that it can be shared by importation, e.g., by other users, into a different instance of the same e-book or a different e-book at process segment 707.

Herein, a "system" is a set of interacting non-transitory tangible elements, wherein the elements can be, by way of example and not of limitation, mechanical components, electrical elements, atoms, physical encodings of instructions, and process segments. Herein, "process" refers to a sequence of actions resulting in or involving a physical transformation. "Storage medium" and "storage media" refer to systems including non-transitory tangible material in or on which information is or can be encoded so as to be readable by a computer; "storage media" may be monolithic, e.g., a CD-ROM, or a distributed, e.g., comprise media of different types and from different sources. "Display medium" and "display media" refer to storage media in which information is encoded in human readable form, whether that be in text, illustrations, photos, charts, etc. "Computer-readable" refers to storage media in which information is encoded in computer-readable form.

Herein, (unless preceded by the word "virtual") "machine", "device", and "computer" refer to hardware or a combination of hardware and software. A "virtual" machine, device or computer is a software analog or representation of a machine, device, or server, respectively, and not a "real" machine, device, or computer. A "server" is a real (hardware or combination of hardware and software) or virtual computer that provides services to computers. Herein, "navigation control" encompasses both real and virtual navigation controls. Virtual navigation controls are any software defined means for navigating through the paths with user interaction including e.g., hyperlinks in the form of text, "soft" buttons and sliders, however activated, e.g., by touch, gestures, or voice. Herein, unless otherwise apparent from context, a functionally defined component of a computer is a combination of hardware and software executing on that hardware to provide the defined functionality. However, in the context of code encoded on computer-readable storage media, a functionally-defined component can refer to software.

Herein, a computer is a machine having co-located or distributed components including computer-readable storage media, a processor, and one or more communications devices. The media stores or is configured to store code representing data including computer-executable instructions. The processor, which can include one or more central-processing units (CPUs), reads and manipulates data in accordance with the instructions. "Communication(s) device (s)" refers to computer-hosted devices used to transmit and/or receive data. Herein, a "computer network" is a network of communicatively coupled real and, in some cases, virtual nodes, wherein the nodes can be, by way of example and not of limitation, servers, network infrastructure devices, and peripherals. Herein, a "node" encompasses real and virtual devices.

In this specification, related art is discussed for expository purposes. Related art labeled "prior art", if any, is admitted prior art. Related art not labeled "prior art" is not admitted prior art. In the claims, "said" qualifies elements for which there is explicit antecedent basis the claims; "the" refers to elements for which there is implicit antecedent basis in the claims; for example, the phrase "the center of said circle" indicates that the claims provide explicit antecedent basis for "circle", which also serves as implicit antecedent basis for "center" since every circle contains exactly one center. In the claims "or" is "inclusive or" unless otherwise indicated. The illustrated and other described examples, as well as modifications thereto and variations thereupon are within the scope of the following claims.

What is claimed is:

1. A system comprising tangible, non-transitory computer-readable storage media encoded with code that, when executed by a processor, causes the processor to:

define an electronic book (e-book) with sections, navigation controls and a path selector;

receive a path-change command to change an active path from a first path to a second path, each of said paths corresponding to a respective series of sections of said e-book linked in an order, said first path differing from said second path in the order of the sections included therein; and in response to said path-change command, change said navigation controls so that they provide for navigation along said second path instead of along said first path, wherein said e-book includes a control that, when activated, presents a graphical interface for creating a new path including at least some of said sections, the graphical interface including a map of said sections and links between said sections.

2. A system as recited in claim 1, further comprising said processor.

3. A system as recited in claim 1, wherein said navigation controls include a table of contents that has:

while said first path is said active path, hyperlink entries corresponding to sections of said first path; and while said second path is the active path, at least one hyperlink entry associated with said second path that is not included in said table of contents while said first path is said active path.

4. A system as recited in claim 1, wherein said first path includes a first section followed immediately by a second section and said second path includes said first section followed immediately by a third section different from said second section, said navigation controls having next-page controls configured so that, while a last page of said first section is displayed:

while said first path is said active path, activating a next-page control causes a first page of said second section to be displayed; and while said second path is said active path, activating a next-page control causes a first page of said third section to be displayed.

5. An e-reader comprising a combination of hardware and software configured to present an electronic book (e-book) in human readable form, said combination to change a currently active path from a first path to a second path, each of said paths including a respective series of sections of said e-book linked in an order, the series of sections associated with said first path differing from the series of sections of said second path in the order of sections included therein, wherein said e-book includes a control that, when activated, presents a graphical interface for creating a new path including at least some of said sections, the graphical interface including a map of said sections and links between said sections.

6. An e-reader as recited in claim 5, wherein said combination includes navigation controls for navigating among sections of said active path and not to a section of said e-book that is not included in said active path.

7. An e-reader as recited in claim 5, wherein said combination displays a table of contents specifying sections of said e-book, the sections specified being a function of the active path.

8. An e-reader as recited in claim 5, wherein said combination provides for importing the new path including sections of different e-books.

9. A process comprising:

while a first path is an active path for an electronic book (e-book) displayed on an e-reader, receiving a selection of a second path to be the active path, said paths including respective series of sections of said e-book linked in an order, the first path differing from the second path in the order of the sections included therein, wherein said e-book includes a control that, when activated, presents a graphical interface for creating a new path including at least some of said sections, the graphical interface including a map of said sections and links between said sections;

responding to the selection by changing a table of contents of said e-book from a representation of a series of sections for said first path to a representation of a second series of sections for said second path; and displaying on said e-reader a map as a graphical aid of all sections of said e-book and links between sections of said e-book.

10. A process as recited in claim 9 wherein, said first and second paths share a common section that is followed by a first section in said first path and a second section in said second path, said responding including changing a navigation control so that a next-page command issued while a last page of said common section is displayed causes a first page of said first section to be displayed while said first path is active and causes a first page of said second section to be displayed while said second path is active.

11. A process as recited in claim 9, further comprising:
receiving at said e-reader a selected arrangement of sections of said e-book; and
creating the new path including a new series of sections of said e-book based on the received selected arrangement.

12. A process as recited in claim 11, wherein said map includes indications of a relative popularity of said all sections of said e-book and said links between sections.

13. A process as recited in claim 12, further comprising exporting a path to make said path available for import to another e-book.

14. A system as recited in claim 1, wherein
relations between sections of the e-book are pre-established by semantic analysis, and
the series of sections corresponding to the first path and the series of sections corresponding to the second path are based on the relations.

15. A process as recited in claim 11, further comprising:
tracking usage of said sections of said e-book; and
updating, on said map, weights assigned to each section of said e-book and each link between sections of said e-book based on the tracked usage.

* * * * *